United States Patent [19]

Hori et al.

[11] Patent Number: 4,801,781
[45] Date of Patent: Jan. 31, 1989

[54] SEMI-AUTOMATIC HOT WIRE TIG WELDING EQUIPMENT

[75] Inventors: Katsuyoshi Hori; Toshiharu Myoga; Miharu Shinomiya; Eiji Watanabe; Kazuki Kusano; Toshiaki Takuwa; Miharu Hafuri, all of Kure, Japan

[73] Assignee: Babcock-Hitachi Kabushiki Kaisha, Tokyo, Japan

[21] Appl. No.: 940,209

[22] Filed: Dec. 15, 1986

Related U.S. Application Data

[63] Continuation-in-part of Ser. No. 828,885, Feb. 13, 1986, abandoned.

[30] Foreign Application Priority Data

Feb. 13, 1985 [JP] Japan .................................. 60-24428
Jun. 3, 1985 [JP] Japan .................................. 60-118917
Oct. 8, 1985 [JP] Japan .................................. 60-153108

[51] Int. Cl.$^4$ ............................................. B23K 9/10
[52] U.S. Cl. ........................... 219/137.71; 219/130.21; 219/132
[58] Field of Search ............... 219/137.2, 137.71, 136, 219/130.33, 130.21, 132

[56] References Cited

U.S. PATENT DOCUMENTS 3,549,857 12/1970 Needham et al. ................ 219/137.2
3,999,697 12/1976 Hill, Jr. ............................. 219/137.2
4,533,817 8/1985 Mäkimaa ........................ 219/137.71

Primary Examiner—Clifford C. Shaw
Attorney, Agent, or Firm—Fay, Sharpe, Beall, Fagan, Minnich & McKee

[57] ABSTRACT

A semi-automatic hot wier TIG (Tungsten Inert Gas) welding equipment comprising: a portable TIG arc torch; a portable filler wire feed torch; a hot wire switching power source for energizing the TIG arc torch, the filler wire feed torch and a base metal; a filler wire feeding device for feeding the wire to the wire feeding torch at a desired rate; a welding condition control device for controlling wire heating power so as to provide wire heating power commensurate to the wire feed rate; means for measuring the resistance value of the wire extension section between the terminal end of the wire and the terminal end of the filler wire feed torch; and means for controlling said filler wire feeding means to change the wire feed rate in response to the detected wire extension.

According to the present invention, the welding operations are performed while the filler wire feed torch is held in one hand and the TIG arc torch is held in the other hand, so that the position where the arc and wire are inserted can be desireably adjusted. Adjustment of the welding conditions such as regulation of the welding arc current and adjustment of wire feed rate can be readily performed during welding.

8 Claims, 7 Drawing Sheets

SEMI-AUTOMATIC HOT WIRE TIG WELDING EQUIPMENT

This application is a continuation in part of application Ser. No. 828,885 filed Feb. 13, 1986 now abandoned.

BACKGROUND OF THE INVENTION

1. Field of the Invention

This invention relates to a TIG (Tungsten Inert Gas) welding equipment, and more particularly to a welding equipment suitable for performing semi-automatic hot wire TIG arc welding.

2. Description of the Prior Art

Figure 1:
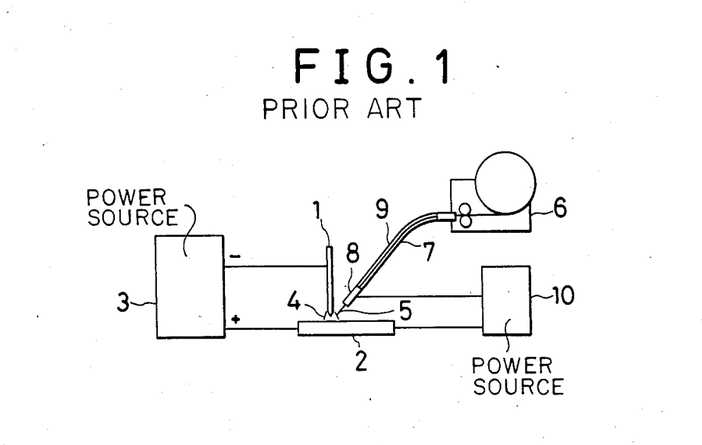
FIG. 1 is a view in explanation of the arrangement of components of the hot wire TIG welding equipment used in common practice.

FIG. 1 is a drawing showing one example of automatic TIG welding of the conventional techniques, wherein an arrangement of the hot wire TIG welding equipment is shown which feeds a filler wire while energizing and heating it. An arc power source 3 for d-c welding is connected to a Tungsten electrode 1 and a base metal 2, and an arc 4 is formed in argon-shield-gas with the Tungsten electrode 1 being the negative electrode. The filler wire 5 is fed from a wire feeding device 6, passed through a conduit 7 and a wire guide 9 including a contact tip 8 connected to the conduit 7, led to an arc generating section, and brought into contact with a base metal 2. In this case, a wire power source 10 is connected to a section between the contact tip 8 and the base metal 2, and direct current or alternating current is fed to the filler wire 5 to initiate Joule heat, whereby the filler wire 5 is increased in melting rate.

Now, in performing the ordinary manual TIG welding, when deposited metal is needed, a welding rod (e.q. diameter: 2 mm and length: 600 mm) is held in the left hand, and a TIG arc torch is held in the right hand, whereby welding is performed while the metal to be deposited is manually supplied. On the other hand, in performing the automatic TIG welding, the filler metal is supplied by a wire feeding device for automatically feeding the filler wire by use of a motor. Both the wire guide and the TIG arc torch are fixedly held by a stand, which is mounted onto a welding carriage for welding.

Figure 2:
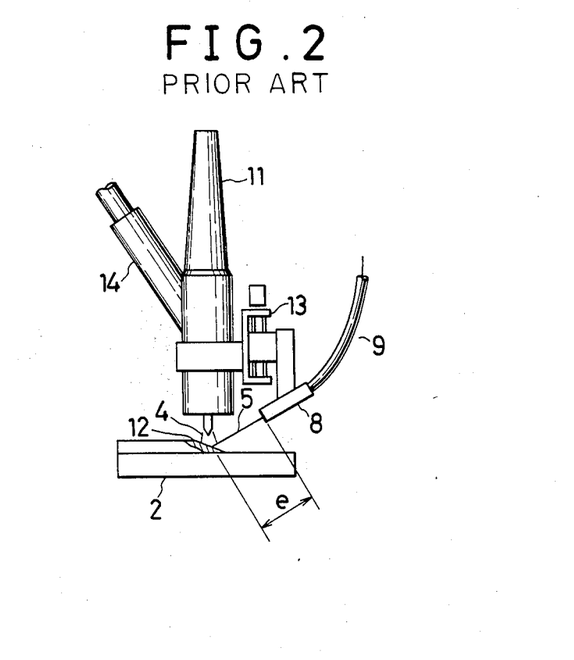
FIG. 2 is an explanatory view showing the use conditions of the conventional semi-automatic TIG welding torch.

A semi-automatic TIG welding is known as one which lies between the two welding methods described above. FIG. 2 shows a semi-automatic TIG welding torch on the market. This torch is constructed such that the wire guide 9 is half-fixedly secured to a portable TIG torch body 11 and the filler wire 5 is automatically fed at a predetermined rate by a wire feeding device. Since the forward end of the filler wire 5 needs to be fed to a proper position in a molten pool 12 formed by the arc 4, the TIG torch body 11 is provided thereon with an adjustor 13 for finely adjusting the filling position. A welder controls a knob in a remote control box of the wire feeding device by the left hand to adjust the wire feed rate, while holding a torch 14 in the right hand and adjusting the position of the torch. In the case of the cold wire method wherein the wire 5 is not energized and heated, normally, the filler wire 5 is fed from a direction proceeding the welding. Whereas, in the hot wire method wherein the filler wire 5 is energized and heated, the filler wire 5 is fed from behind relative to the direction of welding.

Now, in the welding method illustrated in FIG. 2, to change the direction of welding during welding, it is necessary to change a wire filling position as well. This can be done only if the adjustor 13 is adjusted by left hand to adjust the filling position of the filler wire 5. However, while the TIG arc 4 needs a delicate control on the arc length, it is extremely difficult to carry out both the delicate control and the aforesaid adjustment at the same time. After all, the adjustor 13 cannot be used during welding. In consequence, it is unavoidable that the torch is operated such that the welding torch 14 as a whole is changed in direction to change the direction of welding. Furthermore, in order to obtain the proper welding conditions by use of the torch 14 shown in FIG. 2, it is necessary that the position where the forward end of the filler wire 5 enters the molten pool 12 is held at the optimal position. However, when an angle formed between the torch 14 and the base metal 2 is varied, the position where the forward end of the filler wire 5 enters the molten pool 12 is varied to a considerable extent. After all, the angle of holding the torch 14 should be held constant.

As described above, in the semi-automatic TIG welding, wherein the wire guide 9 is fixed to the TIG torch body 11, the torch 14 is restricted in its movement and the freedom in the welding operations is considerably hampered, after all. Then, when the wire guide 9 is separated from the TIG torch body 11, and welding is to be performed while the TIG torch body 11 is held in the right hand and the wire guide 9 is held in the left hand, such disadvantages are presented that the both hands have been already occupied and the remote control operations such as adjustment of feeding rate of the filler wire 5 and regulation of the arc current cannot be carried out.

From the above-described reasons, it is practical to use the torch 14, wherein the torch body 11 and the wire guide 9 as shown in FIG. 2 are integrally formed and capable of being held by one hand. However, the controllability of the torch 14 is not good. In consequence, the semiautomatic TIG welding has not been widely adopted, while it has a great need.

SUMMARY OF THE INVENTION

The present invention has been developed to obviate the above-described disadvantages of the prior art and has as its object the provision of a TIG welding equipment, wherein the wire is automatically fed and welding can be easily performed while the wire feeding guide is held in one hand and a TIG arc torch is held in the other hand.

To this end, the present invention features a semiautomatic hot wire TIG welding equipment comprising:

a portable manually held and moved TIG arc torch;

a portable filler wire feed torch manually held and movable relative to said TIG arc torch;

a hot wire switching power source means for energizing said TIG arc torch, said filler wire feed torch and the base metal;

filler wire feeding means for feeding the wire to said wire feed torch at a desired wire feed rate;

welding condition control means for controlling said power source means to provide wire heating power commensurate to the wire feed rate;

means for measuring the resistance value of the wire extension section between the terminal end of the wire and the terminal end of the filler wire feed torch; and means for controlling said filler wire feeding means to change the wire feed rate in response to the detected wire extension.

According to the present invention, the welding operations are performed while the filler wire feed torch is held in one hand and the TIG arc torch is held in the other hand, so that the position where the arc and the wire are inserted can be desirably adjusted. Furthermore, the welder can vary an extension of wire to instantly change the wire feed rate, so that welding can be performed in the same feeling as in the manual TIG welding by use of the welding rod.

DETAILED DESCRIPTION OF THE INVENTION

Detailed description will hereunder be given of one embodiment of the present invention with reference to the drawings.

Figure 3:
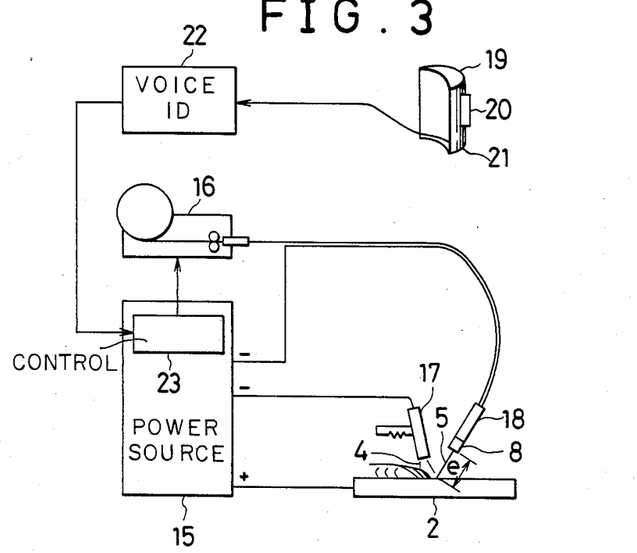
FIG. 3 is an explanatory view showing the arrangement of components of the semi-automatic TIG welding equipment according to the present invention.

FIG. 3 shows the arrangement of components, worked by use of the hot wire switching TIG power source suitable for performing semi-automatic TIG welding according to the present invention.

In FIG. 3, a manual TIG arc torch 17, a manual wire feed torch 18 and a base metal 2 are connected to a hot wire switching TIG welding power source 15, respectively, and fed thereto with currents for TIG arc and for wire heating. The wire feed torch 18 is fed with the wire from a wire feeding device 16. The power source 15 incorporates therein a welding condition control device 23, which is electrically connected to the wire feeding device 16 and a voice identification control device 22, respectively. A helmet 19 is provided with an arc shielding filter 20 using a liquid crystal, which is electrically darkened or lightened, and a microphone 21 which is located close to the mouth of the welder, in the helmet. The welder's voice is detected by the microphone 21, transmitted to the voice identification device, where a command signal corresponding to the voice instructions is formed, and the signal is transmitted to the welding condition control device 23 in the welding power source 15.

When the welding is to be performed with the positions of the arc 4 and the filler wire 5 being desirably adjusted by the both hands as described above, in the case of the ordinary hot wire TIG welding, the arc 4 initiates the magnetic arc blow by the wire heating current flowing through the filler wire 5, and such a disadvantage is presented that the positional relationship between the Tungsten electrode of the TIG arc torch 17 and the filler wire 5 is freely varied, and consequently, the conditions of the magnetic arc blow are not constant, and a stabilized welding result cannot be expected. In this embodiment, the hot wire switching TIG welding power source is used as the power source for the hot wire TIG welding and this disadvantage is obviated.

Figure 4:
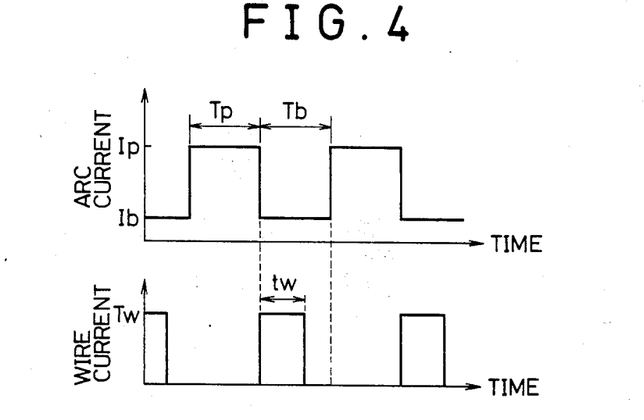
FIG. 4 is a view in explanation of the output current from the welding power source used in the present invention.

FIG. 4 is a view in explanation of the principle of the hot wire switching TIG welding method. In the hot wire switching TIG welding method, pulsed arc is used. As shown in FIG. 4, the wire current is not passed during the peak current time period $T_p$ of the arc, and the wire current is passed for a predetermined time period (tw) during the base current time period $T_b$ in which the arc current is made very low. With this arrangement, although the magnetic arc blow is generated during the base current time period $T_b$ in which the arc current is very low and little contribution is given to the melting of the base metal, the wire current is not passed during the peak current time period $T_p$ to which is allotted most of the melting of the base metal, whereby no magnetic arc blow is generated. With the above-described method, the magnetic arc blow which posed a great problem in the hot wire TIG welding has been substantially eliminated. In consequence, even if the arc length is increased, the wire current is raised and the position and angle of the insertion of the wire are varied, the hot wire TIG welding can be carried out almost similarly to the case of the ordinary cold wire.

Thus the magnetic arc blow is not problem when the arc voltage and the wire current are subject to switching. However, only the wire current may be pulsed, while the arc current is a constant current as usual. This is because although the magnetic arc blow generates in the period the wire current is passed, the arc returns rapidly in situ and generates just under the tungsten electrode in the period the wire current is not passed. Accordingly, if (the wire current energizing pulse period/pulse-cycle period) is enough less than ½ as shown in FIG. 4, the magnetic arc blow which is still present, is not so strong as it makes substantial troubles in an arc welding operation. Accordingly, such heat source for wire heating can be used in the present invention.

Now, when welding is performed with the welding rod being held in hand, melting of the welding rod can be desirably adjusted, however, in the semiautomatic welding wherein the filler wire 5 is automatically fed at a predetermined rate, it is considerably difficult to try to keep a balance between the rate at which the wire is melted in practice and the rate at which the wire is fed. For example, when the wire feed rate is slightly faster than the melting rate, the filler wire 5 is stretched and the distance between the contact tip 8 for energizing the wire, which is disposed at the forward end portion of the wire feed torch 18, and the base metal, i.e. an extension e is gradually increased, so that the normal welding cannot be performed. On the contrary, when the wire feed rate is slightly slower than the melting rate, the excessively molten wire tends to be separated from the base metal. However, when the forward end of the wire is separated from the base metal, an arc is generated between the forward end of the wire and a Tungsten electrode and the forward end is melded by the arc to form a large molten droplet, so that the normal welding cannot be performed. Furthermore, in the hot wire TIG methods in general, the extension e is held constant and control is effected to obtain the wire voltage or the wire current which are applied to the wire commensurate to feed rate. However, it is difficult to hold the extension e constant when the body of the welder moves, because of holding the wire feed torch 18 in hand. When the extension is varied, it becomes also difficult to perform the welding because of an unbalanced relationship between the wire feed rate and the applied power. This drawback can be overcome by effecting control on the wire current such that the wire heating power commensurate to the wire feed rate is constantly supplied.

Figure 6:
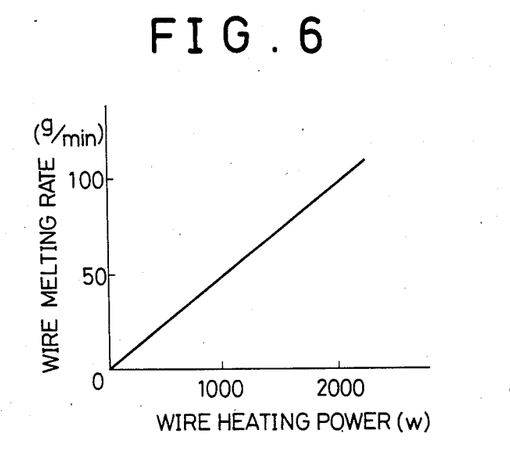
FIG. 6 is a chart showing an example of the relationship between the wire heating power and the wire melting rate.

Now, it is empirically proved that the relationship between the wire heating power and the wire melting rate when no arc is present is a rectilinear relationship. FIG. 6 is the case of a soft steel wire having a diameter of 1.2 mm. Even if the material quality is varied, only the proportional coefficient is changed, so that the rectilinear relationship is still maintained. During the practical welding, a considerable heat quantity is imported to the wire due to the radiant heat from the arc, heat transfer from the molten metal pool and contact with the arc plasma. These heat quantities vary depending on an inserted position and an insertion angle of the wire. However, it is found that, when the inserted position and insertion angle are constant, these heat quantities are regarded as being approximately proportional to the arc current, and, the wire feed rate and the arc current are actually detected, so that a required wire heating power may be determined through the formula shown below.

$$P = 20 \cdot k \cdot V - Iam$$

where: P is an applied power for heating the wire as expressed in W (watt);

k is a variable power coefficient, when the wire material is soft steel and low alloy steel (1½ Cr−1 Mo steel), k=1.0, when the wire material is stainless steel (18 Cr−8 Ni), k=0.9, and k corresponds to a ratio of specific heat (soft steel as being 1.0) of a heat quantity required for heating 1 gr of the wire from the room temperature state into the molten state;

V is a wire feed rate being expressed in the rate of g/min; and

Iam is a mean arc current expressed in A (ampere). And, the wire is energized as shown in FIG. 3. The wire voltage and the wire current, which are applied to the extension e disposed between the contact tip 8 and the base metal 2, are detected, the wire heating power is searched as a product of instantaneous values of the wire voltage and the wire current, the mean value of the wire heating power thus searched in the terms of time is compared with the required wire heating power P searched through the aforesaid formula, and a pulse width tw of the wire current is feedback controlled so that the mean value and the required wire heating power P can be kept in balance. Further, the power coefficient k is made to be variable while the molten state of the wire is watched by the welder, so that the molten state of the wire can be finely adjusted. The wire heating power commensurate to the wire feed rate is fed constantly as described above, so that, even if the extention varies, the wire molten state can be held in the optimal state.

Now, when the manual TIG welding is performed by holding the welding rod in hand, the welding rod is inserted into the molten metal pool 12, whereby the bead shape is desirably controlled. Similarly, there is a case where the wire feed rate is desired to be abruptly or finely changed for the bead control during the both hand-handling semiautomatic TIG welding. This problem has been solved by giving an associated relationship between the extension of the wire and the wire feed rate as will be described hereunder.

Figure 7:
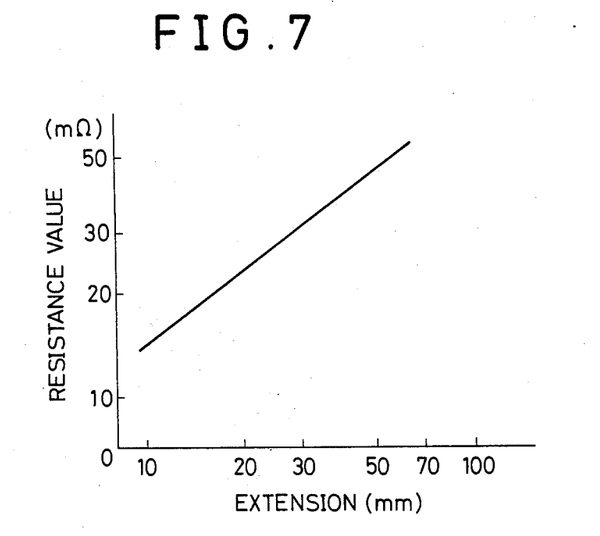
FIG. 7 is a chart showing the relationship between the extension of wire and the electric resistance value.

During the hot wire TIG welding, a wire current wave form and a wire voltage wave form which is generated between the contact tip 8 and the base metal 2, are detected, the result is entered into a divider circuit and a resistance value of the extension e of the wire is searched. It has been empirically proved that a substantially rectilinear relationship can be established between the resistance value of the hot wire and the extension e during the heating by the wire energization in a wide range on a logarithmic section paper regardless of the wire feed rate, the peak value of the wire current and the pulsecycle. FIG. 7 shows the result of experiments when a soft steel wire having a diameter of 1.2 mm is used. When the both hand-handling semiautomatic TIG welding is performed in practice, the welding operation can be easily performed by use of an extension of 10 to 100 mm, particularly, it has been most easy to perform the welding on an extension of 20 to 30 mm. Then, the wire feed rate is made variable in association with the extension as shown in FIG. 8A. The welding can be performed as described above, however, a move of hand made unintentionally by the welder may result in varied wire feed rate.

Figure 8:
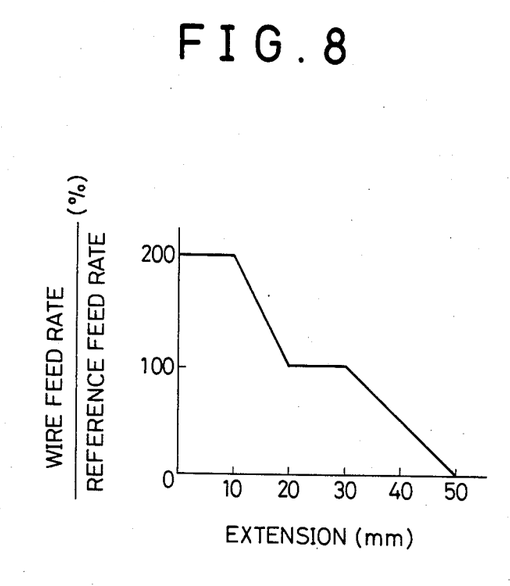
FIG. 8 and FIG. 8A are charts showing the relationship to control the wire feed rate as commensurate to the extension of wire according to the present invention.
Figure 8A:
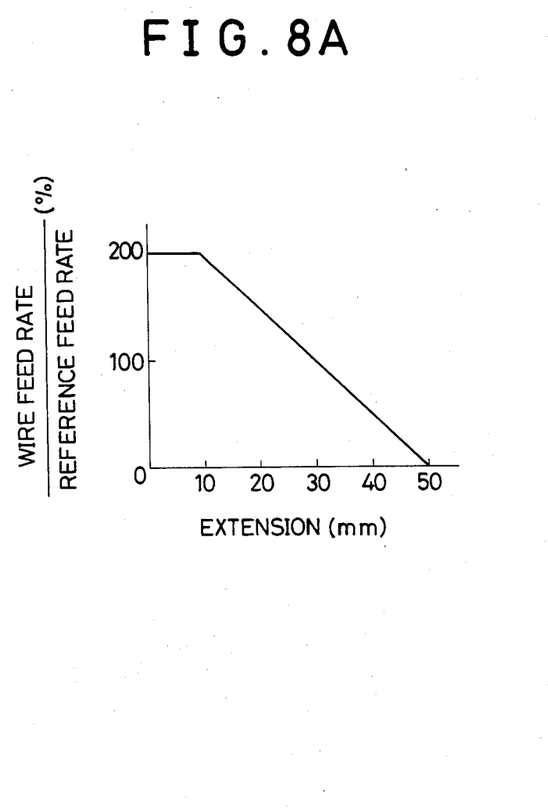

Then, as shown in FIG. 8, when the extension is in a range of 20 to 30 mm, a reference feed rate is set to Vr, when the extension is 10 mm or less, 20% of the reference feed rate is adopted, when the extension is 50 mm or more, the wire feed rate is set to zero, i.e. the wire feed is stopped, and, in sections other than the above, a relationship of the polygonal line in which these sections are connected to one another is adopted, whereby the wire feed rate is made variable in association with the extension. In practice, a circuit for determining the wire feed rate from the wire resistance is assembled into a welding condition control device 23. When the wire extension is searched from FIG. 7, the wire feed rate is searched from the extension thus searched as shown in FIG. 8. Additionally, in order to stop the welding, the welder separates the forward end of the wire from the base metal, to thereby stop the wire feed. There are cases where the forward end of the filler wire 5 is separated from the molten metal pool 12 due to the excessive heating of the wire. In such cases, the welding condition control device 23 may be constructed such that the wire feed rate immediately therebefore is held for a predetermined period of time, e.g. one sec., and, when the forward end of the wire is separated from the molten metal pool 12 for one sec. or more, the wire feed is stopped, interpreting that as if a signal for stopping the wire feed is outputted. The final wire feed rate is determined as described above, and a wire feed device 16 is driven.

Figure 5:
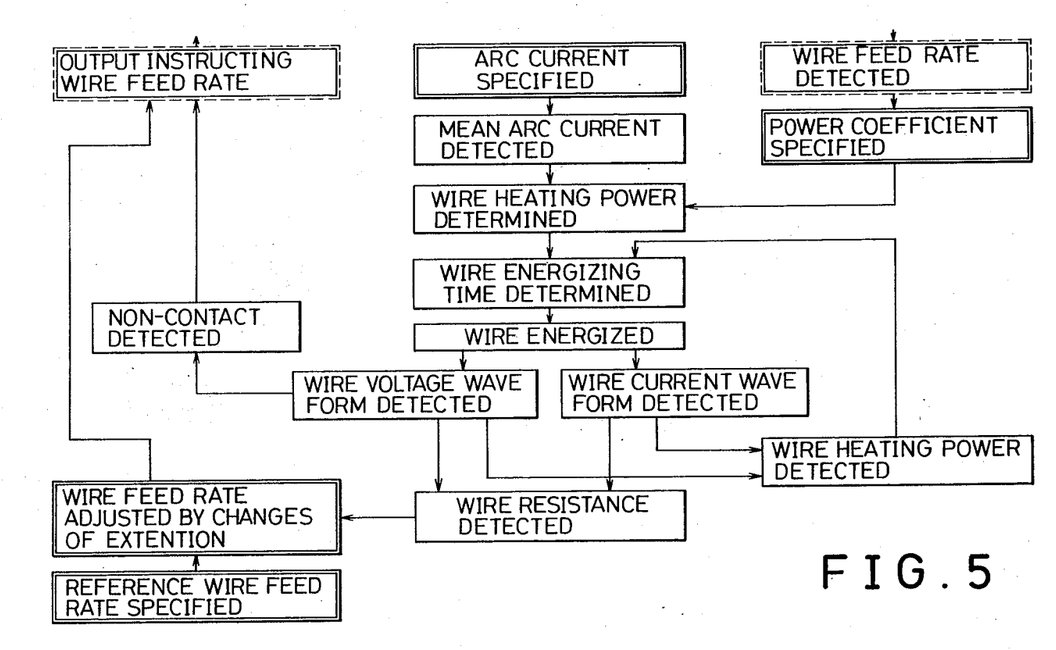
FIG. 5 is a block diagram in explanation of the control system of the TIG arc welding according to the present invention.

FIG. 5 is a flow chart for explaining the operation of the welding condition control device 23 shown in FIG. 3 in detail. Prior to the welding, the reference wire feed rate Vr, the arc current and the power coefficient k are set to the predetermined values, respectively. Furthermore, during the welding, the arc current, the wire current, the wire voltages provided between the wire and the extension e and the wire feed rate are detected, and these values are inputted into the welding condition control device 23. Now, when the forward end of the wire comes into contact with the base metal, the wire voltage is lowered, and this lowered wire voltage is detected to start the wire feed. At this time, the reference wire feed rate Vr is converted into a wire feed rate command signal in association with a length of the extension e in accordance with the relationship shown in FIG. 8 and drives the wire feed device 16. The arc current is specified by Ip, Tp and Ib, Tb as shown in FIG. 4, the arc power source is operated, and the arc current during the welding is sensed to detect the mean current value Iam. The required wire heating power P is searched from this Iam, an actual wire feed rate V and the power coefficient k through a formula of P=20 kV−Iam. On the other hand, an actually applied heating power is detected from the wire voltage and the wire current, which are detected, and a pulse width tw of the wire current is controlled such that the heating power and the aforesaid required wire heating power P are kept in balance. By this closed loop, the desired molten state is automatically held to an optional wire feed rate. On the other hand, the wire voltage and the wire current are entered into the divider circuit to obtain a wire resistance value, the extension is brought into an associated relationship with this resistance value and, the reference wire feed rate Vr is corrected in accordance with the relationship shown in FIG. 8, whereby an actual wire feed rate is determined. The welder can vary the wire feed rate by controlling the wire extension. More specifically, the wire is kept away from the base metal to increase the extension, and the wire is allowed to come near to the base metal to decrease the extension, so that the wire feed rate can be varied. When it is sensed through the wire voltage that the wire is separated from the base metal for one sec. or more, the wire feed is stopped. The welding condition control device 23 functions as described above.

Figure 9:
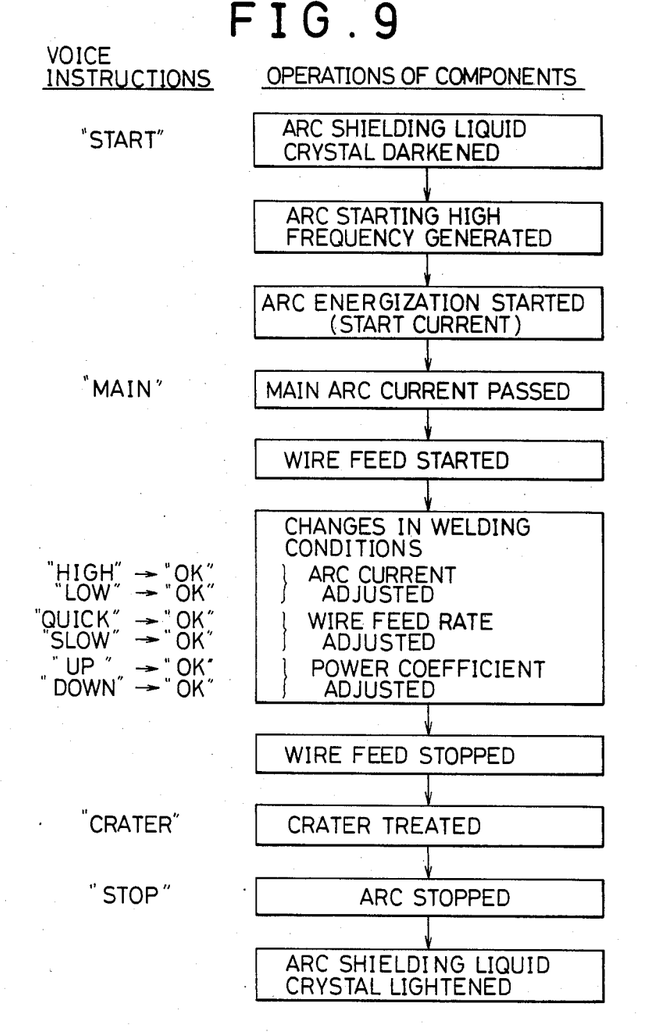
FIG. 9 is a block diagram in explanation of the action of the components when the equipment of the present invention is operated by voice commands.

FIG. 9 is a flow chart showing the steps of operations of the equipment shown in FIG. 3 under voice instructions. Description will hereunder be given of action of the equipment shown in FIG. 3 with reference to the flow chart.

Firstly, prior to the start of welding, the welder sets the welding conditions by use of the welding condition control device 23 positioned in the welding power source so that the reference welding conditions such as the arc current and the wire feed rate can be set at values suitable for the subject to be welded.

Subsequently, the welder enters the arc start position, Putting on the welding helmet 19, and holding the TIG arc torch 17 in the right hand and the wire feed torch 18 in the left hand. At this time, the arc shielding filter 20 remains lightened and the welder can easily observe the position of the arc start.

Then, when the welder pronounces "start", the voice identification device in the control device 22 functions to deliver a voltage signal to the liquid crystal so that the shielding filter 20 of the welding helmet 19 is darkened. Then, after the lapse of a period of time upon being sufficiently darkened, an arc start command signal is transmitted from the control device 22 to the welding condition control device 23 in the welding power source 15. Upon receiving the command, the welding power source 15 emits a high frequency and high voltage for arc start similarly to the common practice, and at the same time, applies an arc voltage to form an arc. At this time, the arc current is set at a preset start current value.

Subsequently, when the welder pronounces "main", the voice identification device functions as aforesaid, and the arc current is changed over to a main arc current value for the proper welding operation.

When melting of the base metal progresses to form a molten pool 12, the wire feed torch 18 is caused to approach the molten pool 12, and the forward end of the filler wire 5 is inserted into the molten pool 12. At this time, short-circuit between the filler wire 5 and the base metal 2 is detected by the welding condition control device 23, a command signal to feed the wire is emitted, and the wire feed is started at a preset reference wire feed rate.

The welding progresses as described above. When the Welder desires to raise the arc current, if he pronounces "high", then a command signal is delivered from the control device 22 to the welding condition control device 23 of the welding power source 15, and the arc current is gradually raised. When the arc current reaches a value desired by the welder, if the welder pronounces "OK", then, the value of the arc current is maintained thereafter. Similarly, when he desires to lower the arc current, he pronounces "low". When he desires to quicken the reference wire feed rate, he pronounces "quick". When he desires to make the reference wire feed rate slow, then he pronounces "slow". When the desired values are reached, respectively, he pronounces "OK", whereby these changes are stopped and the values then are maintained, respectively. Power coefficient is held at a predetermined value by the pronunciation of "up" or "down", for example. As described above, the welding conditions such as the arc current, the wire feed rate, the power coefficient and the like are adjusted.

When the wire feed torch 18 is moved to separate the filler wire 5 from the base metal 2 for more than one second, the welding condition control device 23, upon detecting it, delivers a wire feed stop signal to the wire feeding device 16 to stop the wire feed.

As treatment of craters is necessary at the end of welding operation, the welder pronounces "crater" and an arc signal for treating a crater is initiated. When he pronounces "stop", the arc disappears, and at the same time, the shielding filter 20 is lightened and the welding operations are completed. Thus, the welder can adjust the welding conditions, while holding the TIG arc torch 17 and the wire feed torch 18 in the both hands.

In this embodiment, as the hot wire TIG welding power source free from the adverse influence of the magnetic arc blow, the hot wire switching TIG welding power source has been used, however, the present invention need not necessarily be limited to this, and the power source of any other type, e.g. a power source for heating the wire by use of pulse current may be adopted.

Although efforts have been directed to make the voice identification device used here function in a fashion of exceeding the differences in pronunciation one person after another, the problem concerned with accents in pronunciation of individual welders has not been solved yet. Basically speaking, when the welder using the welding equipment is replaced by a new welder, it is desirable that the voices of the new welder are taught again to the voice identification device.

Spots where the welding operations are performed are frequently located under the environment of high noises, however, when the microphone is located close to the mouth of the welder in the helmet, malfunctions can be avoided.

The automatic arc shielding device for automatically changing the darkness of the filter to watch the arc need not necessarily be limited to one using the liquid crystal, and the device may be replaced by an automatic arc shielding device wherein the filter is mechanically opened or closed.

In the embodiment, which has been described in detail here, the extension section for holding the reference wire feed rate has been provided, whereby, even if the welder slightly shakes his hand unintentionally, the reference wire feed rate can be maintained. Furthermore, a shorter extension feeds the wire quickly and a longer extension feeds the wire slowly, whereby, even when the control by the voice instructions is not effected, the operations can be carried out in the same feeling as in the case where the manual TIG welding is performed by use of the welding rod. This adjustment of the wire feed rate by the varied extension responds quicker than the case of the voice instructions, whereby the quantity of deposit can be easily increased or decreased locally, so that the welding workability can be improved to a considerable extent.

This embodiment has been of such an arrangement that the wire terminal voltage is divided by the wire current, and the resistance in the extension section is obtained for adjusting the wire feed rate, however, such an arrangement may be adopted that the peak value of the wire current as being the pulse current is set at a constant value, or a part of the wire current is set at a constant value, the wire terminal voltage at this part is detected and made to correspond to the wire feed rate.

When the beveling conditions and the like of joints are comparatively uniform and there is no need of changing the welding posture during the welding, it is not necessary to vary the arc current during the welding. In such a case, even when no voice command control device is provided, the both hand-handling semiautomatic welding can easily be performed.

In the case described above, as often adopted in the conventional TIG arc torch, there should be provided a push button switch for instructing the arc start and the start of treatment of a crater.

The welder previously sets power coefficients for the arc current and for the wire feed rate, and a proper power coefficient when the former and the latter are combined. And, in the similar manner as in the ordinary welding, the arc start is made by use of a torch switch, and the arc is switched to the welding current in the arc power source in a predetermined period of time. As a consequence, when the proper molten state of the base metal is found at about the aforesaid time, the wire is inserted into the molten metal pool and the wire feed is started, to thereby enter the steady welding operation. During this welding, the wire extension can be changed to vary the wire feed rate. Thereafter, the wire is separated from the molten base metal pool to stop the wire feed, the treatment of the crater is performed by use of the arc torch switch, and the arc current is automatically stopped in a predetermined period of time, to thereby complete the welding. Additionally, the number of the arc torch switches of the TIG arc may be increased so as to increase or decrease the arc current through the operation of these switches. However, since the forward end of the torch tends to be often deflected during the switch operation, the welding operation tends to be more or less unsteady during the switch operation.

The TIG welding can produce joints high in quality and has such characteristics that it can be applied to welding operations requiring various welding positions, so that the TIG welding has a very wide range of application. However, the manual TIG welding, where a deposited metal is formed by use of the welding rod, has been very low in workability. Furthermore, with the conventional semi-automatic TIG welding method, wherein the cold wire not energized or the hot wire energized is used and the torch is handled in one hand, the controllability of the torch is very low, and this method has not been used widely in practice. Only after the development of the present invention, the semi-automatic hot wire TIG welding can be easily carried out in high controllability and workability, namely, in the same feeling as in the case where the manual TIG welding is performed by use of the conventional welding rod, and the problem of working efficiency has been solved, whereby the field of the practical application of the TIG welding has been greatly widened, so that the present invention can offer outstanding advantages in the industry.

What is claimed is:

1. A semi-automatic hot wire TIG (Tungsten Inert Gas) welding equipment for welding a base metal with filler wire, comprising:
   a portable manually held and moved TIG arc torch;
   a portable filler wire feed torch manually held and movable relative to said TIG arc torch;
   a hot wire switching power source means for energizing said TIG arc torch, said filler wire feed torch and the base metal;
   filler wire feeding means for feeding the wire to said wire feed torch at a desired wire feed rate;
   welding condition control means for controlling said power source means to provide wire heating power commensurate to the wire feed rate;
   means for measuring the resistance value of the wire extension section between the terminal end of the wire and the terminal end of the filler wire feed torch; and
   means for controlling said filler wire feeding means to change the wire feed rate in response to the detected wire extension.

2. The apparatus of claim 1, wherein said power source means provides energizing TIG arc torch current in a pulsed wave form alternating between a peak arc current and a base current; and said power source means energizes said filler wire torch with a pulsed current having peak wire current only during the time period of said base current.

3. The apparatus of claim 1, further including means providing a reference wire heating power based upon the following equation;

$$P = 20 \cdot k \cdot V - Iam$$

where P is an applied power (W) for heating wire, k is a constant of proportionality, V is the wire feed rate (g/min) and Iam is the mean arc current (ampera); means for detecting actual wire current and actual wire voltage; and means comparing the detected actual wire current and detected actual wire voltage with the reference wire heating power to produce a correlated feedback signal and adjust the filler wire feeding means in accordance with said feedback signal.

4. The apparatus according to claim 3, wherein said last mentioned means increases the wire feed rate when the detected extension is less than the reference range and decreases the wire feed rate when the detected extension is greater than the reference range.

5. The apparatus according to claim 1, wherein said last mentioned means compares the detected wire extension with a reference wire extension range, and changes the wire feed rate when the detected wire extension does not fall within the range.

6. The apparatus according to claim 1, further including means for detecting separation of the wire from the base metal and comparing the time of separation with a reference time to produce an excess time signal in response to the time of separation exceeding the reference time; and means for stopping the wire feed in response to said excess time signal and having no effect upon the wire feed rate in response to the absence of said excess time signal.

7. The apparatus according to claim 1, wherein said power source means energizes the filler wire feed torch with a pulsed wire current of a constant value and changing the wire voltage; means detecting the wire voltage and varying the wire feed rate in response to wire voltage.

8. The apparatus according to claim 1, further including means for changing the wire heating power by changing the time that the wire current is provided by said power source means.

* * * * *